United States Patent
Youngblood et al.

(10) Patent No.: US 11,041,051 B2
(45) Date of Patent: Jun. 22, 2021

(54) METHOD FOR DISPERSION OF NANOCELLULOSE IN MELT-PROCESSED POLYMERS

(71) Applicant: Purdue Research Foundation, West Lafayette, IN (US)

(72) Inventors: Jeffrey Paul Youngblood, West Lafayette, IN (US); Caitlyn Michelle Clarkson, West Lafayette, IN (US); Md Nuruddin, West Lafayette, IN (US)

(73) Assignee: Purdue Research University, West Lafayette, IN (US)

( * ) Notice: Subject to any disclaimer, the term of this patent is extended or adjusted under 35 U.S.C. 154(b) by 31 days.

(21) Appl. No.: 16/540,195

(22) Filed: Aug. 14, 2019

(65) Prior Publication Data

US 2020/0102425 A1    Apr. 2, 2020

Related U.S. Application Data

(60) Provisional application No. 62/739,369, filed on Oct. 1, 2018.

(51) Int. Cl.

| | | |
|---|---|---|
| *C08L 33/12* | (2006.01) | |
| *C08L 71/02* | (2006.01) | |
| *C08L 77/02* | (2006.01) | |
| *C08J 3/20* | (2006.01) | |
| *C08J 3/00* | (2006.01) | |
| *C08L 1/02* | (2006.01) | |
| *C08L 77/06* | (2006.01) | |

(52) U.S. Cl.
CPC .............. *C08J 3/005* (2013.01); *C08L 1/02* (2013.01); *C08L 33/12* (2013.01); *C08L 71/02* (2013.01); *C08L 77/06* (2013.01); *C08J 2333/12* (2013.01); *C08J 2367/04* (2013.01); *C08J 2371/02* (2013.01); *C08J 2377/06* (2013.01); *C08J 2401/02* (2013.01)

(58) Field of Classification Search
CPC .......... C08L 77/02; C08L 77/06; C08L 33/12; C08L 1/02; C08L 1/04; C08L 71/02; C08J 2333/12; C08J 2367/04; C08J 2377/06; C08J 2401/02; C08J 2371/02; C08J 2471/02
See application file for complete search history.

(56) References Cited

U.S. PATENT DOCUMENTS

| | | |
|---|---|---|
| 4,481,076 A | 11/1984 | Herrick |
| 2013/0331536 A1 | 12/2013 | Harkonen et al. |
| 2016/0319467 A1* | 11/2016 | Yamato .................. C08B 15/06 |
| 2016/0340827 A1* | 11/2016 | Yamato ............... D06M 13/325 |
| 2019/0194831 A1* | 6/2019 | Yamato .................. C08L 33/10 |

OTHER PUBLICATIONS

Volk et al; Enhanced homogeneity . . . amphiphiles; European Polymer Journal; 7; pp. 270-281. (Year: 2015).*
Arias et al; Enhanced dispersion of cellulose nanocrystals . . . nanocomposites, Cellulose; 22; pp. 483-498. (Year: 2015).*
Hanif et al (Butanol-mediated oven-drying . . . dehydration rate, J. Poly. Res.; 2018, 25(191); pp. 1-10; Published online on Oct. 23, 2017; (Year: 2018).*
Sullivan Erin M., et al., Processing and Characterization of Cellulose Nanocrystals/Polylactic Acid Nanocomposite Films. Materials, 2015, 8, 8106-8116.
Oksman Kristiina, et al., Review of the recent developments in cellulose nanocomposite processing. Composites: Part A 83 (2016) 2-18.
Chakrabarty Arindam, et al., Recent Advances in Nanocellulose Composites with Polymers: A Guide for Choosing Partners and How to Incorporate Them. Polymers 2018, 10, 517.

* cited by examiner

*Primary Examiner* — Karuna P Reddy

(74) *Attorney, Agent, or Firm* — Purdue Research Foundation; Zhigang Rao

(57) ABSTRACT

The present disclosure relates to a novel method for dispersion of nanocellulose in melt-processed polymers without the introduction of solvent during melt processing.

6 Claims, 7 Drawing Sheets

METHOD FOR DISPERSION OF NANOCELLULOSE IN MELT-PROCESSED POLYMERS

CROSS-REFERENCE TO RELATED APPLICATION

This application claims the benefits of U.S. Provisional Application Ser. No. 62/739,369 filed Oct. 1, 2018, the contents of which are incorporated herein entirely.

GOVERNMENT RIGHTS

This invention was made with the United States government support under National Science Foundation (NSF) Award No. 1144843-DGE. The United States government has certain rights in the invention.

TECHNICAL FIELD

The present disclosure relates to a novel method for dispersion of nanocellulose in melt-processed polymers without the introduction of solvent during melt processing.

BACKGROUND

This section introduces aspects that may help facilitate a better understanding of the disclosure. Accordingly, these statements are to be read in this light and are not to be understood as admissions about what is or is not prior art.

Impressive mechanical properties and reinforcing capability, abundance, low weight, renewability, and biodegradability make nanocellulose such as cellulose nanofibrils (CNFs) and/or cellulose nanocrystals (CNCs) ideal candidates for the processing of polymer nanocomposites. With a Young's modulus of over 100 GPa and a surface area of several hundred $m^2 \cdot g^{-1}$, they have the potential to significantly reinforce polymers at low filler loadings. A broad range of potential applications of nanocellulose exist even if a high number of them remain unknown to date. Many scientific publications and experts show its potential even if most of the studies focus on their mechanical properties as a reinforcing phase and their liquid crystal self-ordering properties. See Azouz. K., et al., Simple Method for the Melt Extrusion of a Cellulose Nanocrystal Reinforced Hydrophobic Polymer, ACS Macro Lett. 2012, 1, 236-240.

However, substantially homogeneous dispersion of nanocellulose within an organic polymer matrix has proven to be very challenging. It has been shown that good dispersion in polymer matrix requires special modification of the CNF surface. However, even strong hydrophobisation of CNF surface does not necessarily lead to good dispersion, CNF fibrils tend to agglomerate when blended to polymer.

Therefore, there is an unmet need for novel method that can provide substantially homogeneous dispersion of nanocellulose within an organic polymer matrix.

SUMMARY

The present disclosure to a novel method for substantially homogeneous dispersion of nanocellulose in melt-processed polymers without the introduction of solvent during melt processing.

In one embodiment, the present disclosure provides a method of preparing a substantially homogeneous nanocellulose-dispersed organic hydrophobic polymer composition, wherein the method comprises:

a) preparing a nanocellulose solution with a first solvent;
b) preparing an organic additive solution with a second solvent, wherein the second solvent is capable of being a common solvent for said nanocellulose and said additive, and the first and the second solvent may be same or different;
c) mixing the nanocellulose solution and the additive organic additive solution to provide a solution mixture of said nanocellulose and said organic additive;
d) removing said first solvent and said second solvent from said solution mixture to provide a substantially solvent free composition comprising said nanocellulose and said organic additive; and
e) melt-compounding said solid composition comprising said nanocellulose and said organic additive with an organic hydrophobic polymer to provide a substantially homogeneous nanocellulose-dispersed polymer comprising said nanocellulose, said organic additive, and said organic hydrophobic polymer.

DETAILED DESCRIPTION

Figure 1:
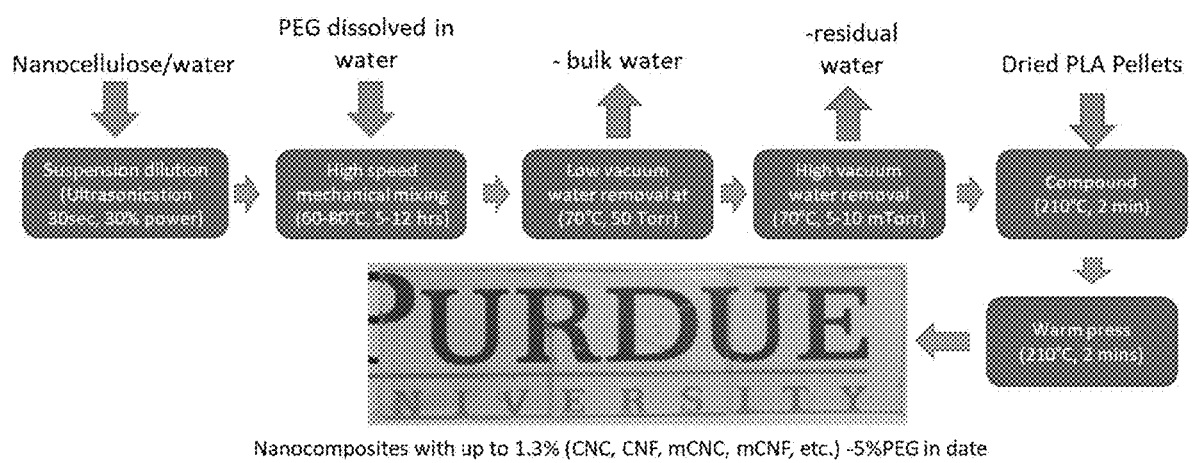
FIG. 1 shows the generalized method for production of nanocellulose-polylactic acid (PLA) nanocomposites with polyethylene glycol (PEG).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "solution" refers to a homogeneous or substantially homogeneous mixture composed of two or more substances. In some aspects, the term "solution" may refer to a colloid mixture as far as the mixture is visually clear/transparent and is a homogeneous or substantially homogeneous mixture composed of two or more substances.

In all drawings, the term "our method" means the method of preparing a substantially homogeneous nanocellulose-dispersed organic hydrophobic polymer composition that comprises five steps a)-e) as shown in Summary.

In one embodiment, the present disclosure provides a method of preparing a substantially homogeneous nanocellulose-dispersed organic hydrophobic polymer composition, wherein the method comprises:
  a) preparing a nanocellulose solution with a first solvent;
  b) preparing an organic additive solution with a second solvent, wherein the second solvent is capable of being a common solvent for said nanocellulose and said additive, and the first and the second solvent may be same or different;
  c) mixing the nanocellulose solution and the additive organic additive solution to provide a solution mixture of said nanocellulose and said organic additive;
  d) removing said first solvent and said second solvent from said solution mixture to provide a substantially solvent free composition comprising said nanocellulose and said organic additive; and
  e) melt-compounding said solid composition comprising said nanocellulose and said organic additive with an organic hydrophobic polymer to provide a substantially homogeneous nanocellulose-dispersed polymer comprising said nanocellulose, said organic additive, and said organic hydrophobic polymer.

In one embodiment, the nanocellulose comprises cellulose nanofibrils (CNFs), cellulose nanocrystals (CNCs), or a combination thereof. In one aspect, the nanocellulose is primarily cellulose nanocrystals (CNCs).

In any embodiment, the organic additive in the method should be compatible with both the nanocellulose and the hydrophobic polymer to ensure the substantially homogeneous nanocellulose-dispersed polymer comprising the nanocellulose, the organic additive, and the organic hydrophobic polymer.

In one embodiment, an organic additive may serve as not only the organic additive, but also the first solvent and the second solvent when the organic additive is compatible with the nanocellulose and the hydrophobic polymer, and can be used as a solvent for nanocellulose. In one example or aspect, PEG can be served as the first solvent for the nanocellulose and the organic additive, and the second solvent for itself.

In one embodiment, said first and said second solvent are both water.

In one embodiment, said first solvent is water, said second solvent is a water soluble organic solvent. In one aspect, the water soluble organic solvent comprises alcohols, ketones, esters, ethers, acetonitrile, or any combination thereof. In one aspect, the water soluble organic solvent comprises a straight or branched $C_1$-$C_5$ alcohol, acetone, ethyl acetate, tetrahydrofuran, acetonitrile, or any combination thereof.

In one embodiment, said additive may be polyethylene glycol (PEG), sugars include but are not limited to sorbitol or mannitol, natural acids include but are not limited to citric acid, esters include but are not limited to phthalate ester, dicarboxylic acid esters, phosphate esters, sulfonamides benzoates, glycerides include but are not limited to mono-glycerides, di-glycerides, or tri-glycerides, any derivative thereof, or any combination thereof. Glycerides (mono-, di-, or tri-), such as glycerol monostearate, are food grade additives which can be biologically sourced. These materials are experimental plasticizers in polyamides and have been explored as a potential plasticizer for EVOH in the present work. Glycerides have hydroxyl groups on one side which bind well to celluloses and a hydrophobic tail on the other. In one aspect, the molecular weight of PEG is below 20,000 g/mol.

In one embodiment, said organic hydrophobic polymer comprises polylactic acid (PLA), Poly(Lactide-co-Glycolide) (PGLA), polycaprolactone, polyhyroxyalkanoates, ethylene vinyl alcohol (EVOH), Poly(hexano-6-lactam) (Nylon 6), Poly[imino(1,6-dioxohexamethylene) iminohexamethylene] (Nylon 66), Poly(11-aminoundecanoicacid) (Nylon 11), Poly(dodecano-12-lactam) (Nylon 12), Poly (methyl methacrylate) PMMA, polystyrene, Acrylonitrile butadiene styrene (ABS), Polyacrylonitrile (PAN), Polyvinyl chloride (PVC), any derivative thereof, or any combination thereof.

In one aspect, the weight percentage of nanocellulose, additive, and hydrophobic polymer in the final melt-processed polymer is about 0.1-5%, 0.5-25%, 70-95%, respectively. In one aspect, the weight percentage of nanocellulose is about 0.5-5%, 0.5-4%, 0.5-3%, 0.5-2%, 0.5-1%. In one aspect, the weight percentage of an additive is about 0.5-20%, 0.5-15%, 0.5-10%, 0.5-5%, 0.5-1%. In one aspect, the weight percentage of a hydrophobic polymer is about 70-90%, 70-85%, 70-80%, 70-75%, 80-95%, 80-90%, or 80-85%.

Experimental Sections

Preparation of Polyethylene Glycol-Nanocellulose-Polylactic Acid Composites

Various nanocellulose, modified and unmodified, have been dispersed in polyethylene glycol and then melt compounded into polylactic acid (PLA) using the methods described herein. The nanocelluloses investigated include mechanically fibrillated cellulose nanofibrils (CNFs), cellulose nanocrystals (CNCs), and some chemically modified nanocelluloses. For the various systems, up to 1.25% nanocellulose has been achieved. Larger concentrations could be achieved with increasing plasticizer content and increasing nanocellulose content in the plasticizer. These processes have not been optimized.

To prepare polyethylene glycol (PEG)/nanocellulose solutions from 1-20 wt % nanocellulose, two solutions were made. A PEG/water solution was prepared by mechanically mixing at 40-50° C. for 5-10 min. A premeasured quantity of nanocellulose/water suspension was diluted with additional water, Table 1, and then ultrasonicated to insure good dispersion after dilution (30% power, 1 sec pulse, 1 sec off). The solutions were combined and allowed to mechanically mix at high speed at 50-60° C. for up to 12 hrs such that water would begin to evaporate during the mixing process. After mixing, the bulk of the remaining water was removed using a rotary evaporator at 70° C. and 50 Torr. To remove residual water, a high vacuum heat oven (70° C., 5 mTorr) was used.

TABLE 1

Preparation of PEG/Nanocellulose solutions

| Sample | Amount of final solution (g) | Initial nanocellulose concentration (%) | PEG (g) | Nanocellulose suspension (g) | Water in nanocellulose (g) | Additional water (g) | Water in PEG |
|---|---|---|---|---|---|---|---|
| 2% CNF/PEG | 100 | 3 | 98.0 | 66.7 | 64.7 | 64.7 | 49 |
| 1% CNC/PEG | 20 | 12.2 | 19.8 | 1.6 | 1.4 | 20 | 20 |
| 5% CNC/PEG | 20 | 12.2 | 19.0 | 8.2 | 7.2 | 20 | 20 |
| 10% CNC/PEG | 20 | 12.2 | 18.0 | 16.4 | 14.4 | 20 | 20 |
| 20% CNC/PEG | 20 | 12.2 | 16.0 | 32.8 | 28.8 | 50 | 20 |

Premeasured materials were melt compounded at 210° C. and 100 rpm in a twin-screw Xplore 5 cc micro-compounder. Prior to compounding, PLA pellets were dried at 100° C. overnight to remove absorbed water. Half of the pellets were first loaded into the compounder, then the nanocellulose/PEG solution was injected and allowed to compound for 30-45 sec. The remaining pellets were added, and the material was compounded for 45-60 sec. The entire process is between 2-2.5 min. The material was collected on a glass plate directly from the orifice of the compounder.

Films were made by compression molding PLA and PLA nanocomposites between mylar release films on a Carver warm press at 200° C. at 2 metric tonnes of pressure for 2 min. Metal shim material was used to determine film thickness and after molding the material was quenched to room temperature. A generalized schematic for the process is shown in FIG. 1.

Comparison Methods

Several comparison groups were prepared using the similar materials for competitive methods of processing nanocellulose composites. A brief description is given for each. For all methods, 210° C., 100 rpm, and a 2-2.5 min processing time were maintained.

Direct Liquid Feeding

In direct liquid feeding, a premeasured amount of CNC/water suspension is directly injected into the molten polymer and allowed to compound until all water vapor had been removed.

Direct Liquid Feeding with Compatibilization

Direct liquid feeding with compatibilization is the process of first 'compatibilizing' PLA with polyethylene glycol (PEG) and then injecting the CNC/water suspension into the polymer melt and allowing water vapor to evaporate before extrusion.

Melt Compounding of Freeze-Dried Material

Melt compounding of the freeze-dried material was performed by injecting freeze-dried material into the polymer melt, allowing it to compound, and then extruding it.

Melt Compounding of Freeze-Dried Material with Compatibilization

Melt compounding of the freeze-dried material was performed by injecting freeze-dried material into the polymer melt after PEG has been added to the polymer melt, allowing it to compound, and then extruding it.

Polylactic Acid-Nanocellulose-Polyethylene Glycol Materials Dispersion

Figure 2:
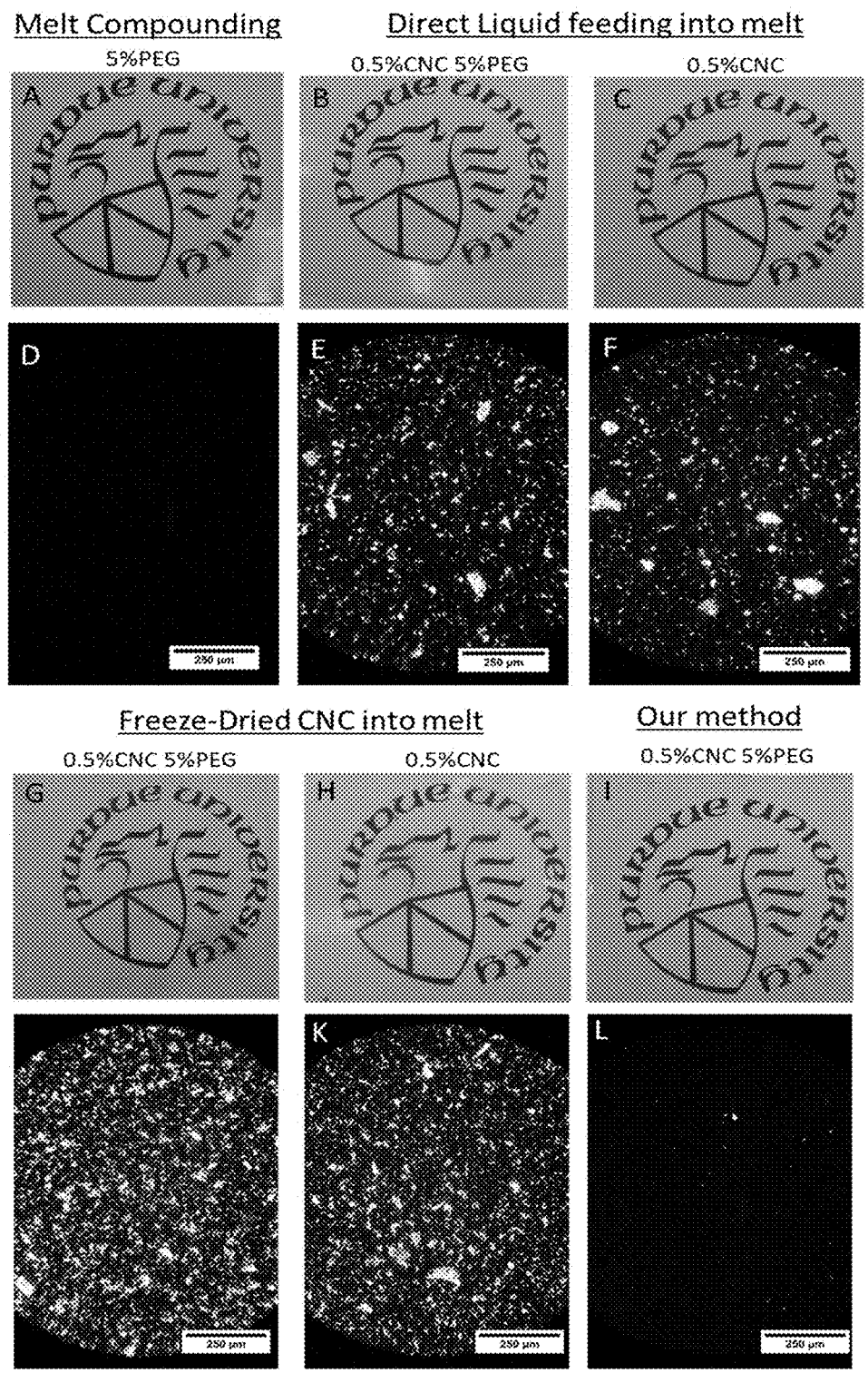
FIG. 2 shows images of PLA-CNC composites at a fixed concentration (0.5% CNC) produced by various methods. Composites containing PEG were at 5% PEG. The method of the present disclosure provided appreciably enhanced dispersion (as evidenced by fewer white speckles/granules in crossed-polarized microscopy) over either liquid feeding of CNC in water or dry feeding of CNC and is similar to no CNCs in plasticized PLA.
Figure 3:
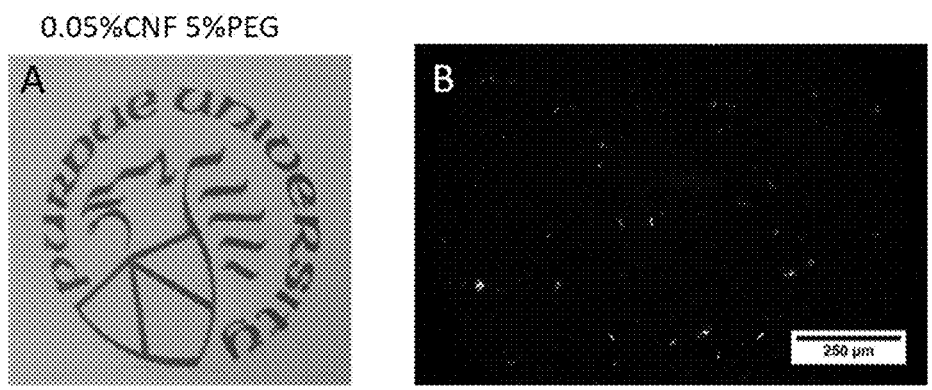
FIG. 3 shows images of 0.05% CNF-5% PEG-PLA composite and that the process gives similar results for CNF as CNC.

FIG. 2 and FIG. 3 show the dispersion achieved in in PLA with cellulose nanocrystals (CNCs) and cellulose nanofibrils (CNFs) with 5% PEG using the method of the present disclosure by first adding the nanocellulose to a suitable plasticizer and then removing solvent prior to compounding (FIG. 2 I and FIG. 3). All PLA films were transparent with little visible agglomeration to the human eye as nanocellulose and PLA have very similar indices of refraction. However, when viewed between linearly cross-polarized light, agglomerations become obvious. In the case of the PLA composites, four comparison materials were made: freeze-dried CNC, CNC-suspension injected materials, and PEG compatibilized materials for each (FIG. 2 B-H). All methods demonstrated good distributive mixing, indicating that the high shear mixing of the twin-screw system was enough to distribute the materials throughout the PLA. The materials produced by direct liquid feeding resulted in generally better dispersion compared the to freeze-dried materials which showed many large agglomerations. However, the process of the present disclosure produced the highest level of dispersion with few to none large agglomerations observed, indicating excellent dispersion. Likewise, CNF can be dispersed using the method of the present disclosure. CNF exhibited lower dispersion, most likely due to pre-existing entanglements of the long nanoparticles (500-1000 nm) that were carried over from the water-suspension.

Processing and Characterization of Ethylene Vinyl Alcohol (EVOH)-Sorbitol-Cellulose Nanocrystal (CNC) Nanocomposites Preparation of EVOH/Sorbitol/CNC Nanocomposite Films Using Melt Processing Sorbitol was dissolved in distilled water to make a 12.1 wt % solution. Varying amounts of the 12.1 wt % CNC suspension were added to the sorbitol solution to make the sorbitol/CNC components of the mixture shown in Table 2. The sorbitol/CNC solution was stirred overnight at 50° C. Then, 30-40 g of the sorbitol/CNC solution was poured into polystyrene petri dishes and kept in an oven at 60° C. for 2 days to evaporate the water. Once dried, a mortar and pestle were used to grind the sorbitol/CNC solution into a powder.

A conical twin screw Xplore Micro Compounder MC 5 was used to melt compound the materials together. All heating zones were set to 200° C. and screw speed set at 100 rpm. Ethylene vinyl alcohol (EVOH) pellets and the sorbitol/CNC dried powders were premeasured to make the ratios shown in Table 2 for a combined sample mass of 2 g per batch. Polypropylene (PP) pellets followed by neat EVOH was used to purge the compounder before running. Samples were run from lowest sorbitol/CNC concentration to highest. EVOH pellets were mixed until completely melted (about 1 minute). Half of the sorbitol/CNC powder was added and allowed to mix for 20 seconds before adding the rest of the sorbitol/CNC powder and mixing 1 minute before extruding.

A Carver hot press set at 200° C. was used to compress the extruded material into a film. For 30 seconds, plates were slowly compressed to maintain contact with the sample without any applied pressure to melt the sample. The sample was then compressed under a pressure of 1 metric ton for 1 minute. The thickness of the film was controlled using a steel spacers of 0.025 mm thickness, and Kapton® polyimide film sheets were used to prevent sticking.

Figure 4:
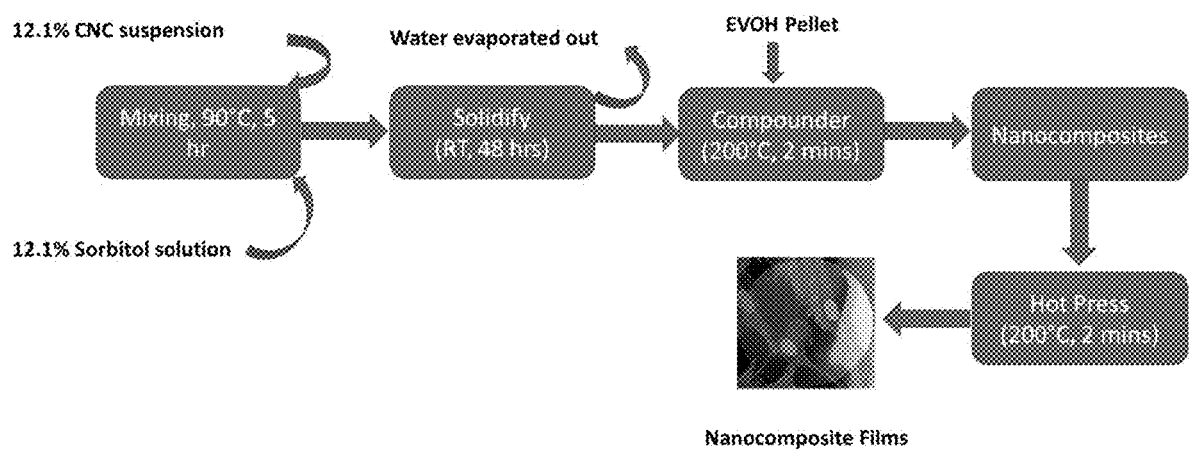
FIG. 4 shows process method for production of CNC-EVOH nanocomposite with sorbitol.

A similar process was followed for freeze dried CNCs/EVOH nanocomposite films. Premeasured amounts of freeze dried CNC were melt compounded into EVOH at 200° C. and 100 rpm prior to extrusion. The material was then compression molded following the procedure. A generalized schematic of the EVOH process is shown in FIG. 4.

TABLE 2

EVOH/Sorbitol/CNC and EVOH/GMS/CNC nanocomposite films prepared using melt processing.

| Sample | EVOH (wt %) | | CNC (wt %) |
|---|---|---|---|
| | | Sorbitol (wt %) | |
| 100EVOH | 100 | — | — |
| 5Sorbitol-95EVOH | 95 | 5 | — |
| 10Sorbitol-90EVOH | 90 | 10 | — |
| 1CN-5Sor-94EVOH | 94 | 5 | 1 |
| 1CN-10Sor-89EVOH | 89 | 10 | 1 |
| 3CN-10Sor-87EVOH | 87 | 10 | 3 |
| | | GMS (wt %) | |
| 100EVOH | 100 | — | — |
| 5GMS-95EVOH | 95 | 5 | — |
| 1CN-5GMS-94EVOH | 87 | 10 | 3 |

Glycerol Monostearate (GMS)-CNC powder in Table 2 was made by the following method: Glycerol monostearate (GMS or MGS)-cellulose nanocrystal mixtures were prepared at 1%, 5% and 10% CNC in GMS. First, separate solutions of ethanol and GMS and CNC and dionized water were prepared by mechanical mixing the solutions. Both solutions were heated at 60° C. during mechanical mixing; the GMS/ethanol mixture dissolved. The ratio of added ethanol/water was 3:1, however, a ratio of 1:1 was also tested and acceptable powders were produced. The CNC/water solution was sonicated at 30% power amplitude for 30 sec prior to adding the heated solution slowly to the heated GMS/ethanol solution during mechanical mixing. The solution could mechanically mix for 30 minutes while covered under medium speed and at a temperature of 60° C. and sonicated a second time at 30% power amplitude for 30 sec at the half-way point. The CNC/GMS solution was transferred to pre-heated glassware and a vacuum of 50 Torr and 50° C. was used to remove the bulk solvent. The powder was transferred to a high vacuum (50° C., 5 mTorr) to remove residual solvent and a mortar and pestle was used to grind the large, flakey powder into a fine power by hand.

Figure 10:
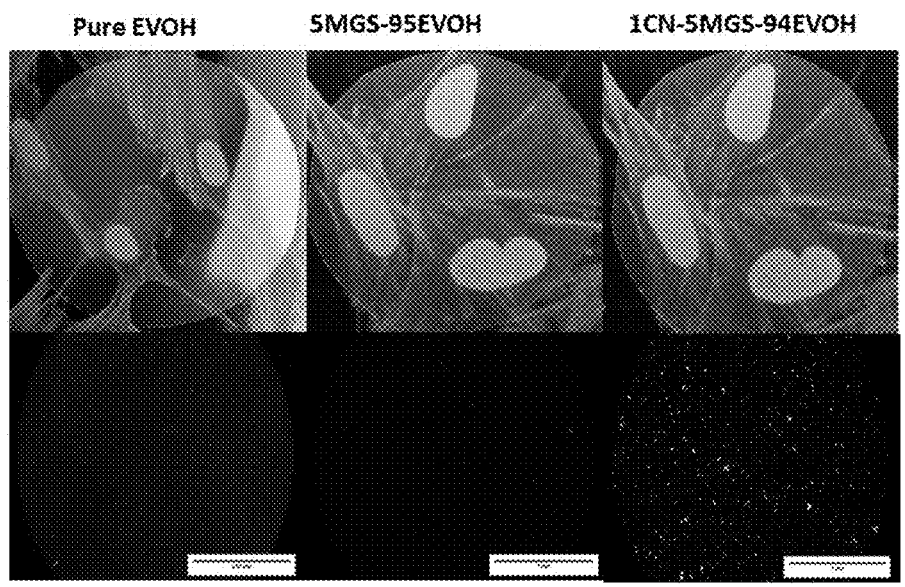
FIG. 10 shows images of EVOH/GMS/CNC melt compounded films.

The images of EVOH/GMS/CNC melt compounded films are demonstrated in FIG. 10.

Ethylene Vinyl Alcohol-Sorbitol-Cellulose Nanocrystal Dispersion

Figure 5:
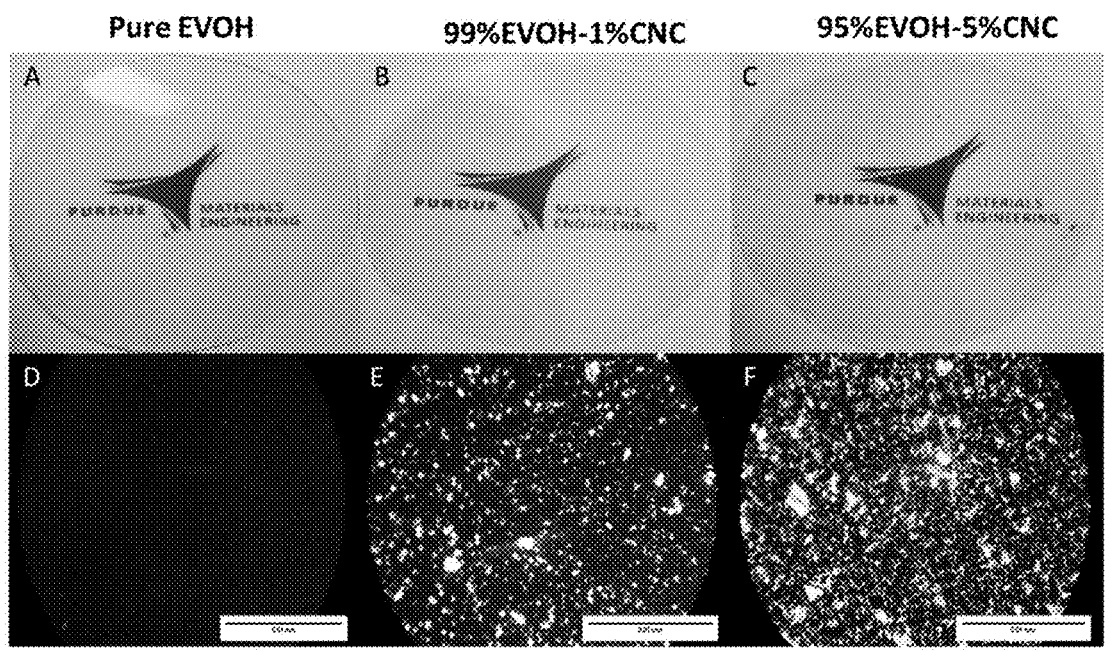
FIG. 5 shows images of EVOH/Freeze Dried CNC Films (all melt compounded).
Figure 6:
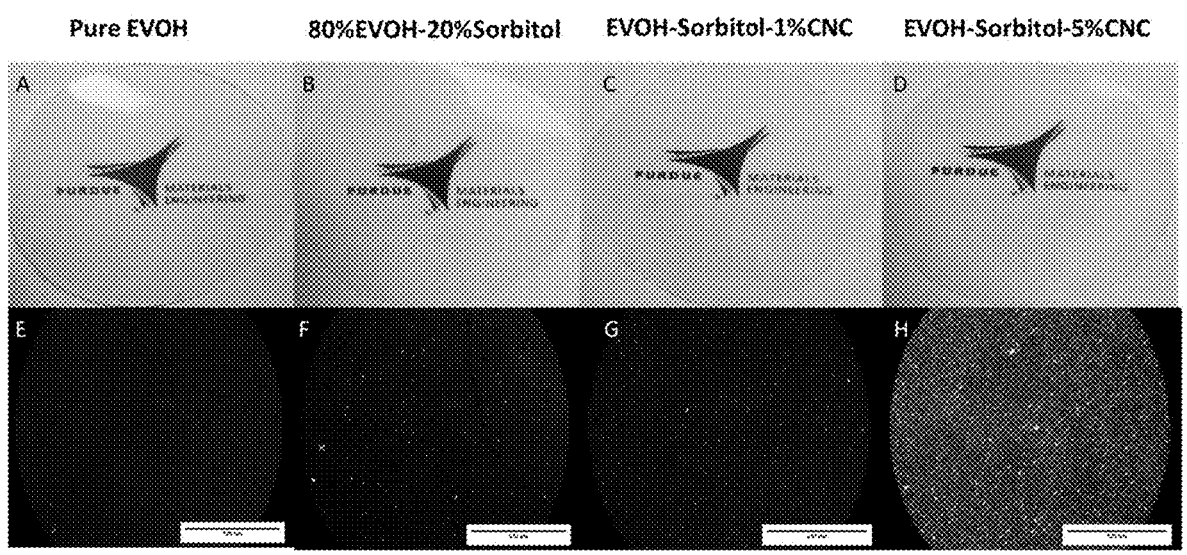
FIG. 6 shows images of EVOH/sorbitol/CNC melt compounded films by the method of present disclosure. The method of the present disclosure provided appreciably enhanced dispersion (as evidenced by fewer white speckles/granules in crossed-polarized microscopy) over dry feeding of CNC and is similar to plasticized EVOH without CNCs.
Figure 7:
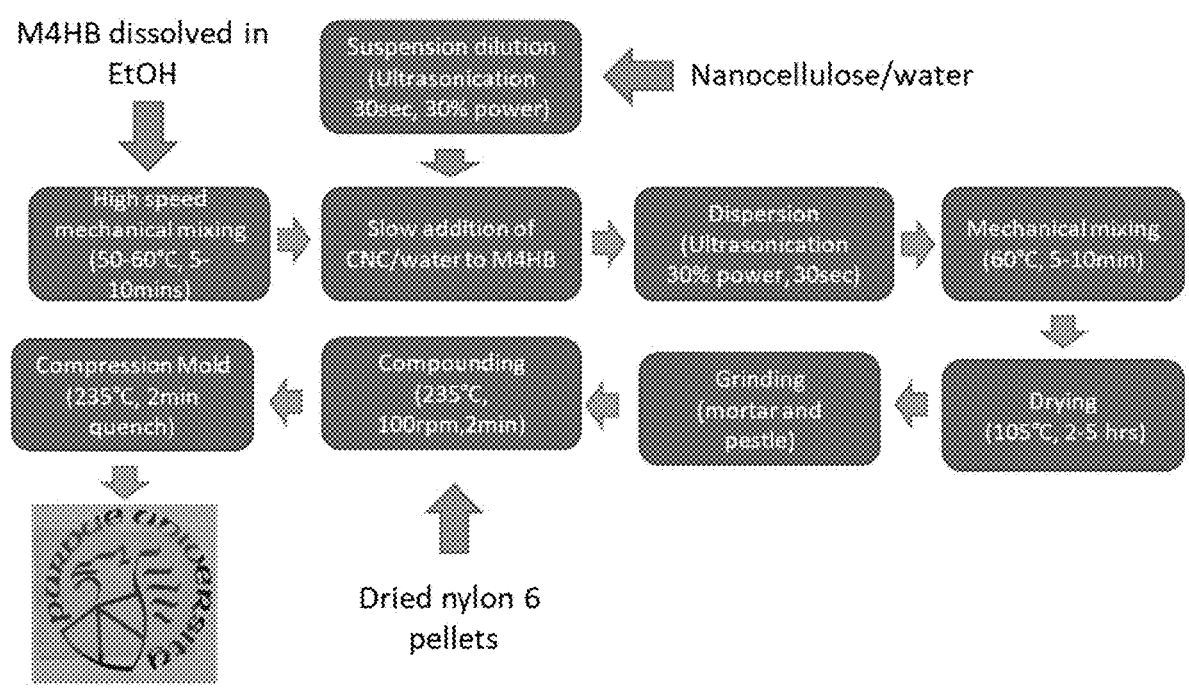
FIG. 7 shows generalized process for nylon 6 with M4HB and CNC.

Like the PLA-CNC-PEG materials shown previously, the EVOH-Sorbitol-CNC composites (FIG. 6) produced using the plasticizer addition/delivery method showed good dispersion compared to freeze-dried materials of the same CNC content (FIG. 5). Like the PLA materials, the freeze-dried method showed large agglomerations at 1% and 5% CNC, while the sorbitol containing materials showed improved dispersion at 1% and 5% CNC.

Preparation of Nylon 6-Methyl4-Hydroxybenzoate (M4HB)-Cellulose Nanocrystal Composites Methyl-4hydroxybenzoate (M4HB) and cellulose nanocrystal (CNC) solutions were prepared for nylon 6. Currently, a solution of M4HB is prepared from ethanol (EtOH) by dissolving M4HB into EtOH at 50° C. while mechanically mixing. Separately, CNC/water suspension is diluted and ultrasonicated (30 sec total, 30% powder, 1 sec pulse, 1 sec off). The diluted CNC suspension is than added in small quantities to the M4HB/EtOH solution such that the change in temperature from adding the CNC/water solution is not significant to cause the M4HB to fall out of solution (since it is very concentrated and must be kept warm to remain dissolved). The solution is mechanically mixed at 50-60° C. for 10 min on high speed and then sonicated (30 sec total, 30% power, 1 sec pulse, 1 sec off). The solution is mechanically mixed again for 10 min on high speed. It is then transferred to a flat dish and directly to a drying oven at 105° C. where the solution the ethanol/water evaporates, and the material crystallizes for 2-5 hrs. After crystallization, the material is collected and ground into a fine powder using a mortar and pestle. The experimental quantities used so far are shown in Table 3.

Nylon was dried at 100° C. for 12 hrs prior to compounding in the Xplore 5 cc micro-compounder. Premeasured quantities of plasticizer are used to create composites with 9% M4HB and varying contents of CNC. The barrel temperature was 235° C. and the screw speed was 100 rpm for these experiments. Half of the material was put into the compounder, then the plasticizer was added followed by the remaining nylon 6 pellets. The material was compounded for 2 min total before collection. Nylon 6, 9% M4HB-nylon 6, and freeze-dried comparison samples were compounded following the same procedure.

All samples were compression molded on a Carver warm press between PTFE plastic sheets at 235° C. for 2 min and 2 metric tons of pressure and then quenched to room temperature.

TABLE 3

Preparation of M4HB/Nanocellulose solutions.

| Sample | Amount of final solution (g) | Initial nanocellulose concentration (%) | M4HB (g) | CNC/water (g) | Water in CNC (g) | Additional water (g) | Ethanol (g) |
|---|---|---|---|---|---|---|---|
| 10% CNC/M4HB | 10 | 12.2 | 9.0 | 8.2 | 7.2 | 2.5 | 13.5 |

Nylon 6-Methyl4-Hydroxybenzoate (M4HB)-Cellulose Nanocrystal (CNC) Dispersion

Figure 8:
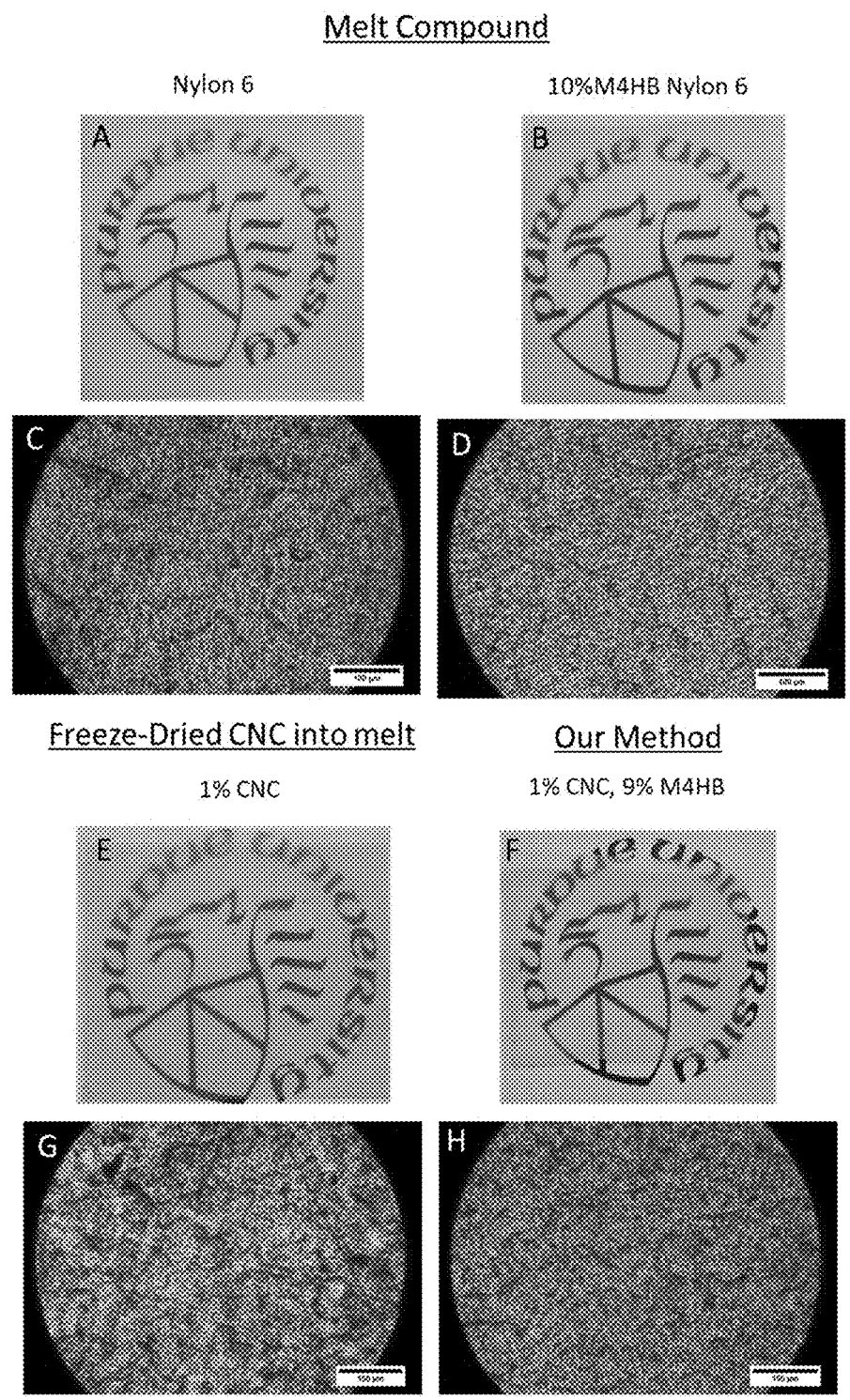
FIG. 8 shows Nylon and nylon nanocomposites compounded with the method of the present disclosure and a comparison group with freeze-dried CNC.
Figure 9:
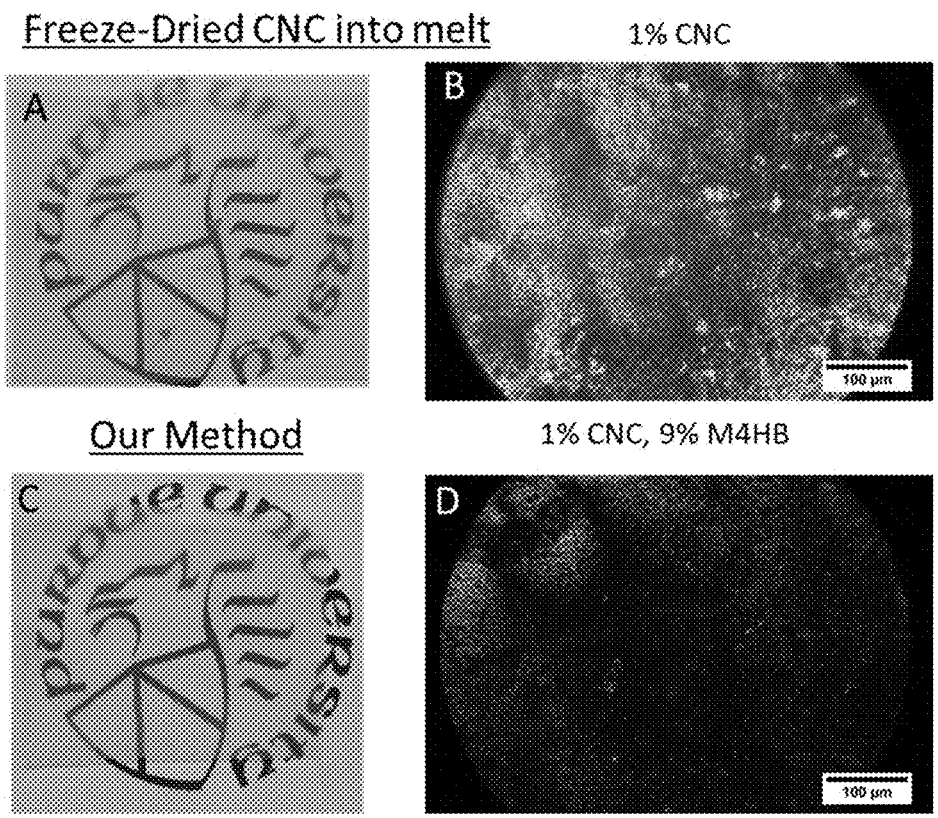
FIG. 9 shows images comparing two methods for adding 1% CNC to nylon 6. The method of the present disclosure provided appreciably enhanced dispersion (as evidenced by fewer brown/tan speckles/granules in crossed-polarized microscopy) over dry feeding of CNC. Brown burnt CNC aggregates are visible (indicated by arrows) in dry added CNCs, but are missing in the method of the present disclosure.

Compared the freeze-dried material, the method of the present disclosure appeared to be able to produce good dispersion in nylon 6 for the current procedure (FIG. 8.). The nylon 6 composites were quenched to prevent crystallization so that dispersion could be easily examined; however, they exhibited a mixture of crystallize and non-crystalline structures as nylon is a fast crystallization material. Consequently, all materials exhibited a 'frosted glass' look. The freeze-dried CNC nylon 6 composites were more yellow and there are noticeable black flecks in the material (FIG. 9 A). In less crystalline areas, agglomerations could be observed in the freeze-dried nylon 6 composite while in FIG. 9 B. The method of the present disclosure shows less agglomerations.

Preparation of Nylon 6/Glycerol Monostearate/Cellulose Nanocrystal Composites

A complete list of composite formations developed for nylon 6/M4HB and nylon 6/GMS with CNC has been provided in Table 4.

TABLE 4

Nylon 6 nanocomposites prepared by melt processing:

| Sample | Nylon 6 (wt %) | M4HB (wt %) | CNC (wt %) |
|---|---|---|---|
| 100Nylon6 | 100 | — | — |
| 95Nylon6-5M4HB | 95 | 5 | — |
| 94.4Nylon6-5M4HB-0.6CNC | 94.4 | 5 | 0.6 |
| 90Nylon6-10M4HB | 90 | 10 | — |
| 88.9Nylon6-10M4HB-1.1 CNC | 88.9 | 10 | 1.1 |

| Sample | Nylon 6 (wt %) | GMS (wt %) | CNC (wt %) |
|---|---|---|---|
| 100Nylon6 | 100 | — | — |
| 95Nylon6-5GMS | 95 | 5 | — |
| 94.9Nylon6-5GMS-0.1CNC | 94.9 | 5 | 0.1 |
| 94.7Nylon6-5GMS-0.3CNC | 94.7 | 5 | 0.3 |
| 90Nylon6-10GMS | 90 | 10 | — |
| 94.4Nylon6-5GMS-0.6CNC | 94.4 | 10 | 0.6 |
| 89.9Nylon6-5GMS-0.1CNC | 89.9 | 10 | 0.1 |
| 89.4Nylon6-10GMS-0.6CNC | 89.4 | 10 | 0.6 |
| 88.9Nylon6-10GMS-1.1CNC | 88.9 | 10 | 1.1 |

Polymethylmethacrylate (PMMA, Acrylic) and CNC Composites with Polyethylene Glycol (PEG) as the Plasticizer Polymethylmethacrylate (PMMA) is a highly transparent, amporphous polymer used commonly as shatter-resistant glass. PMMA is not hydrophilic and has a high melt viscosity which are challenges for incorporating nanocellulose particles. Like PLA, polyethylene glycol (PEG) can be used as a plasticizer, thought typically higher molecular weights (1500 g/mol) are used. The procedure to exchange CNCs into PEG was used for a higher molecular weight (1500 g/mol); the higher molecular weight is a solid at room temperature and was a solid after the CNCs were exchanged from water into PEG1500. PMMA/CNC composites were prepared by melt-compounding following the same procedure as the poly(lactic acid) nanocellulose composites using the melt compounding procedure of PLA to produce the preliminary compositions in Table 5. As transparency is very important for PMMA applications, it is crucial that a process to create these nanocomposites preserves the transparency of the original sample. The nanocomposite with ~0.6% CNC and 10% PEG1500 exhibits good dispersion with no visual signs of agglomeration.

TABLE 5

PMMA nanocomposites prepared by melt processing.

| Sample | Nylon 6 (wt %) | M4HB (wt %) | CNC (wt %) |
|---|---|---|---|
| 100 PMMA | 100 | — | — |
| PMMA-10PEG | 90 | 10 | — |
| PMMA-10PEG-0.6CNC | 89.4 | 10 | 0.6 |

Those skilled in the art will recognize that numerous modifications can be made to the specific implementations described above. The implementations should not be limited to the particular limitations described. Other implementations may be possible.

We claim:

1. A method of preparing a substantially homogeneous nanocellulose-dispersed organic hydrophobic polymer composition, wherein the method comprises:
   a) preparing a nanocellulose solution with a first solvent;
   b) preparing an organic additive solution with a second solvent, wherein the second solvent is capable of being a common solvent for said nanocellulose and said additive, and the first and the second solvent may be same or different, wherein the organic additive is selected from the group consisting of polyethylene glycol (PEG), sugars, natural acids, phthalate ester, dicarboxylic acid esters, phosphate esters, sulfonamides, benzoates, glycerides, any derivative thereof, or any combination thereof;
   c) mixing the nanocellulose solution and the organic additive solution to provide a solution mixture of said nanocellulose and said organic additive;
   d) removing said first solvent and said second solvent from said solution mixture under vacuum condition and at a temperature of at least 50° C. to provide a substantially solvent free composition comprising said nanocellulose and said organic additive; and
   e) melt-compounding said substantially solvent free composition comprising said nanocellulose and said organic additive with an organic hydrophobic polymer to provide a substantially homogeneous polymer composition comprising said nanocellulose, said organic additive, and said organic hydrophobic polymer, wherein said organic hydrophobic polymer comprises polylactic acid (PLA), Poly(Lactide-co-Glycolide) (PGLA), polycaprolactone, polyhyroxyalkanoates, ethylene vinyl alcohol (EVOH), Poly(hexano-6-lactam) (Nylon 6), Poly[imino(1,6-dioxohexamethylene) iminohexamethylene] (Nylon 66), Poly(11-aminoundecanoicacid) (Nylon 11), Poly(dodecano-12-lactam) (Nylon 12), Poly(methyl methacrylate) (PMMA), polystyrene, Acrylonitrile butadiene styrene (ABS), Polyacrylonitrile (PAN), Polyvinyl chloride (PVC), any derivative thereof, or any combination thereof.

2. The method of claim 1, wherein the nanocellulose comprises cellulose nanofibrils (CNFs), cellulose nanocrystals (CNCs), or a combination thereof.

3. The method of claim 1, wherein said first and said second solvent are both water.

4. The method of claim 1, wherein said first solvent is water, said second solvent is a water soluble organic solvent.

5. The method of claim 4, wherein said second solvent comprises alcohols, ketones, esters, ethers, acetonitrile, or any combination thereof.

6. The method of claim 5, wherein said first solvent is water, said second solvent is a straight or branched $C_1$-$C_5$ alcohol, acetone, ethyl acetate, tetrahydrofuran, acetonitrile, or any combination thereof.

* * * * *